(12) United States Patent
Matsubara et al.

(10) Patent No.: US 12,280,439 B2
(45) Date of Patent: Apr. 22, 2025

(54) CUTTING TOOL BODY, CUTTING INSERT, AND CUTTING TOOL

(71) Applicant: SUMITOMO ELECTRIC HARDMETAL CORP., Itami (JP)

(72) Inventors: Kouki Matsubara, Itami (JP); Tomoyuki Fukuyama, Itami (JP); Shota Takemura, Itami (JP); Shota Tsujimoto, Itami (JP); Naoki Matsuda, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 737 days.

(21) Appl. No.: 17/437,425

(22) PCT Filed: Mar. 25, 2020

(86) PCT No.: PCT/JP2020/013250
§ 371 (c)(1),
(2) Date: Sep. 9, 2021

(87) PCT Pub. No.: WO2020/196597
PCT Pub. Date: Oct. 1, 2020

(65) Prior Publication Data
US 2022/0152713 A1 May 19, 2022

(30) Foreign Application Priority Data
Mar. 27, 2019 (JP) .................. 2019-060277

(51) Int. Cl.
*B23C 5/10* (2006.01)
*B23C 5/20* (2006.01)

(52) U.S. Cl.
CPC ............ *B23C 5/109* (2013.01); *B23C 5/20* (2013.01); *B23C 2210/168* (2013.01)

(58) Field of Classification Search
CPC .......... B23C 2210/168; B23C 2250/12; B23C 5/109; B23C 5/20; B23C 2200/0411;
(Continued)

(56) References Cited

U.S. PATENT DOCUMENTS 5,593,255 A * 1/1997 Satran .................. B23C 5/109
407/116
6,293,737 B1 9/2001 Satran et al.
(Continued)

FOREIGN PATENT DOCUMENTS

EP 3 476 512 A1 5/2019
JP 8-71830 A 3/1996
(Continued)

*Primary Examiner* — Sara Addisu
(74) *Attorney, Agent, or Firm* — XSENSUS LLP

(57) ABSTRACT

The first seating surface is contiguous to each of the front end surface and the outer circumferential surface. The second seating surface is contiguous to the front end surface. The cutting tool body is provided with a recess contiguous to each of the first seating surface, the second seating surface, and the front end surface. When the front end surface is viewed in a direction from the front end surface toward the rear end surface, a length of the recess in a direction perpendicular to a straight line parallel to the central axis and extending along the first seating surface is equal to or longer than three times as long as a length of the recess in a direction perpendicular to the first seating surface and passing through a contact point of the second seating surface, the recess, and the front end surface.

12 Claims, 12 Drawing Sheets

(58) Field of Classification Search
CPC ........ B23C 2200/085; B23C 2200/125; B23C 2200/208; B23C 2210/0442; B23C 5/06; B23C 5/202

See application file for complete search history.

(56) References Cited

U.S. PATENT DOCUMENTS

| | | | | |
|---|---|---|---|---|
| 8,454,277 | B2* | 6/2013 | Dudzinsky | B23C 5/2204 407/103 |
| 8,858,126 | B2* | 10/2014 | Morrison | B23C 5/1045 407/34 |
| 9,475,131 | B2* | 10/2016 | Waggle | B23C 5/109 |
| 2006/0013661 | A1* | 1/2006 | Long, II | B23C 5/2213 407/113 |
| 2006/0260439 | A1* | 11/2006 | Tubinger | C21D 7/06 76/108.6 |
| 2010/0003090 | A1* | 1/2010 | Johansson | B23C 5/202 407/113 |
| 2011/0150586 | A1 | 6/2011 | Fang et al. | |
| 2012/0009029 | A1 | 1/2012 | Saji | |
| 2013/0101363 | A1 | 4/2013 | Yoshioka | |
| 2017/0008099 | A1* | 1/2017 | Touma | B23C 5/109 |
| 2017/0326656 | A1* | 11/2017 | Saji | B23C 5/109 |
| 2020/0398352 | A1* | 12/2020 | Arumugam | B23C 5/202 |
| 2022/0118533 | A1* | 4/2022 | Passov | B23C 5/20 |
| 2022/0161334 | A1* | 5/2022 | Matsubara | B23B 27/1607 |
| 2024/0139835 | A1* | 5/2024 | Shiroma | B23C 5/2213 |

FOREIGN PATENT DOCUMENTS

| | | |
|---|---|---|
| JP | 8-141819 A | 6/1996 |
| JP | 2000-158225 A | 6/2000 |
| JP | 2005-532177 A | 10/2005 |
| JP | 2006-205298 A | 8/2006 |
| WO | 03/101654 A1 | 12/2003 |
| WO | 2011/162081 A1 | 12/2011 |
| WO | 2016/186112 A1 | 11/2016 |

* cited by examiner

CUTTING TOOL BODY, CUTTING INSERT, AND CUTTING TOOL

CROSS-REFERENCE TO RELATED APPLICATIONS

The present application is based on PCT filing PCT/JP2020/013250, filed Mar. 25, 2020, which claims priority to JP 2019-060277, filed Mar. 27, 2019, the entire contents of each are incorporated herein by reference.

TECHNICAL FIELD

The present disclosure relates to a cutting tool body, a cutting insert, and a cutting tool.

BACKGROUND ART

Japanese Patent Laying-Open No. 08-71830 (PTL 1) discloses an end mill having an insert pocket in which a cutting insert is held. In the end mill, a longitudinal recessed groove is formed in a boundary portion between a side wall surface and a bottom surface of the insert pocket.

Japanese Patent Laying-Open No. 08-141819 (PTL 2) discloses a throw-away tip to be attached to a milling tool. The throw-away tip is obliquely chamfered on its bottom surface side.

CITATION LIST

Patent Literature

PTL 1: Japanese Patent Laying-Open No. 08-71830
PTL 2: Japanese Patent Laying-Open No. 08-141819

SUMMARY OF INVENTION

A cutting tool body according to the present disclosure includes a front end surface, a rear end surface, an outer circumferential surface, a first seating surface, and a second seating surface. The rear end surface is located opposite to the front end surface. The outer circumferential surface is contiguous to the front end surface. The first seating surface is contiguous to each of the front end surface and the outer circumferential surface. The second seating surface is contiguous to the front end surface and located closer to a central axis than the outer circumferential surface. The cutting tool body is provided with a recess contiguous to each of the first seating surface, the second seating surface, and the front end surface. When the front end surface is viewed in a direction from the front end surface toward the rear end surface, a length of the recess in a direction perpendicular to a straight line parallel to the central axis and extending along the first seating surface is equal to or longer than three times as long as a length of the recess in a direction perpendicular to the first seating surface and passing through a contact point of the second seating surface, the recess, and the front end surface.

A cutting insert according to the present disclosure includes a top surface, a bottom surface, and a side surface. The bottom surface is located opposite to the top surface. The side surface is contiguous to each of the top surface and the bottom surface. A ridgeline between the top surface and the side surface includes a cutting edge. The side surface includes: a first side surface portion contiguous to the bottom surface and inclined at a first angle relative to the bottom surface; and a second side surface portion contiguous to the first side surface portion and inclined at a second angle relative to the bottom surface. The first angle is larger than the second angle.

A cutting tool according to the present disclosure includes a body and a cutting insert provided in the body. The body includes: a front end surface; a rear end surface located opposite to the front end surface; an outer circumferential surface contiguous to the front end surface; a first seating surface contiguous to each of the front end surface and the outer circumferential surface; and a second seating surface contiguous to the front end surface and located closer to a central axis than the outer circumferential surface. The body is provided with a recess contiguous to each of the first seating surface, the second seating surface, and the front end surface. When the front end surface is viewed in a direction from the front end surface toward the rear end surface, a length of the recess in a direction perpendicular to a straight line parallel to the central axis and extending along the first seating surface is equal to or longer than three times as long as a length of the recess in a direction perpendicular to the first seating surface and passing through a contact point of the second seating surface, the recess, and the front end surface. The cutting insert includes: a top surface; a bottom surface located opposite to the top surface; and a side surface contiguous to each of the top surface and the bottom surface. A ridgeline between the top surface and the side surface has a cutting edge. The side surface has: a first side surface portion contiguous to the bottom surface and inclined at a first angle relative to the bottom surface; and a second side surface portion contiguous to the first side surface portion and inclined at a second angle relative to the bottom surface. The first angle is larger than the second angle. The bottom surface faces the first seating surface and the side surface faces the second seating surface.

DETAILED DESCRIPTION

Figure 1:
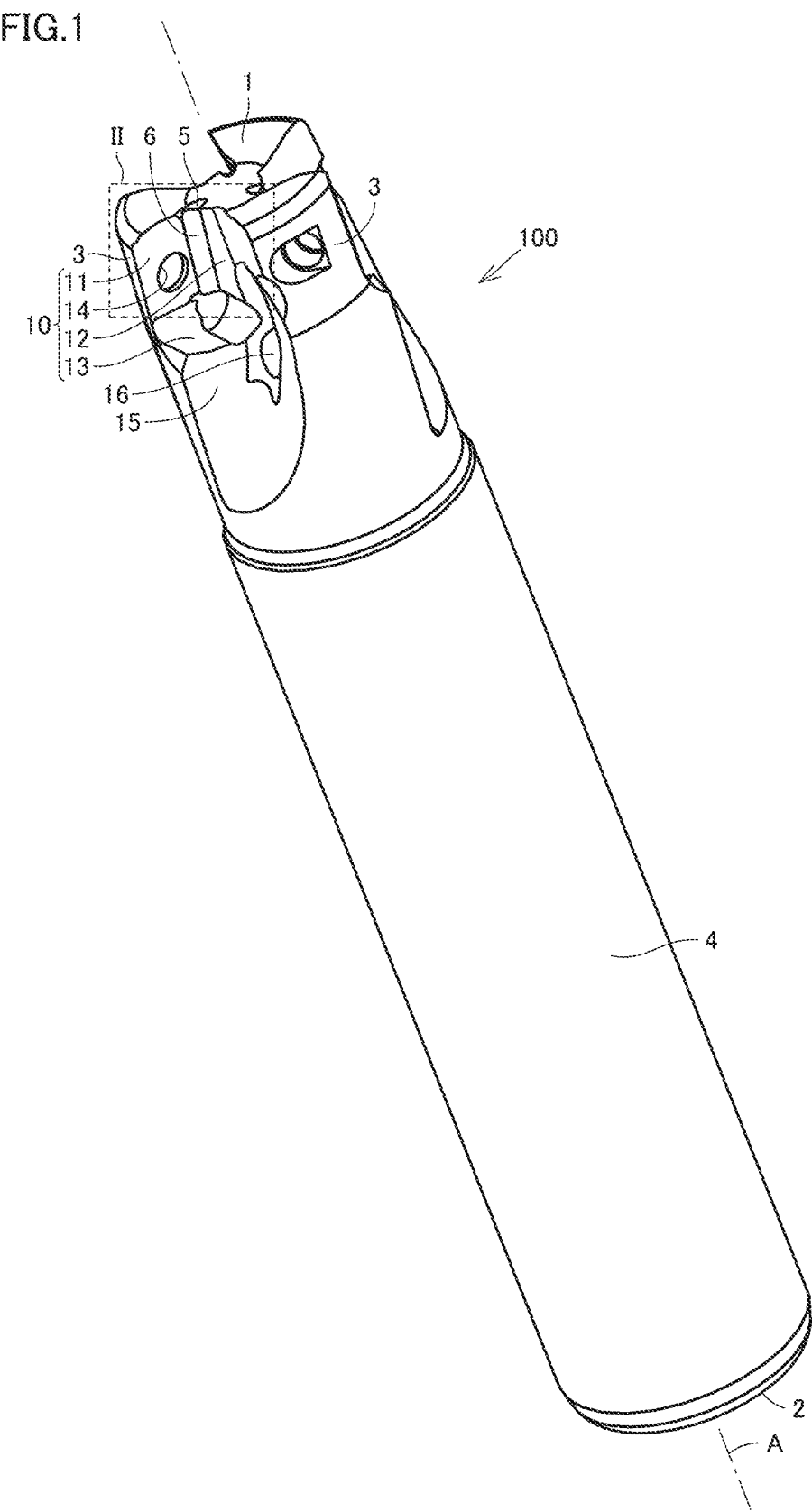
FIG. 1 is a schematic perspective view showing a configuration of a cutting tool body according to a first embodiment.

Problem to be Solved by the Present Disclosure

The cutting tool body, the cutting insert, and the cutting tool are however required to be further improved in rigidity.

It is an object of the present disclosure to provide a cutting tool body, a cutting insert, and a cutting tool, each of which can be improved in rigidity.

Advantageous Effect of the Present Disclosure

According to the present disclosure, a cutting tool body, a cutting insert, and a cutting tool each of which can be improved in rigidity can be provided.

Description of Embodiments

First, embodiments of the present disclosure will be described.

(1) A cutting tool body 100 according to the present disclosure includes a front end surface 1, a rear end surface 2, an outer circumferential surface 3, a first seating surface 11, and a second seating surface 12. Rear end surface 2 is located opposite to front end surface 1. Outer circumferential surface 3 is contiguous to front end surface 1. First seating surface 11 is contiguous to each of front end surface 1 and outer circumferential surface 3. Second seating surface 12 is contiguous to front end surface 1 and located closer to a central axis A than outer circumferential surface 3. Cutting tool body 100 is provided with a recess 5 contiguous to each of first seating surface 11, second seating surface 12, and front end surface 1. When front end surface 1 is viewed in a direction from front end surface 1 toward rear end surface 2, a length of recess 5 in a direction perpendicular to a straight line parallel to central axis A and extending along first seating surface 11 is equal to or longer than three times as long as a length of recess 5 in a direction perpendicular to first seating surface 11 and passing through a contact point of second seating surface 12, recess 5, and front end surface 1.

In cutting tool body 100 according to (1), recess 5 is formed to extend toward central axis A of body 100. Thus, as compared with the case where recess 5 is formed to extend in the circumferential direction of body 100, the main stress of the cutting force can be distributed toward central axis A of highly rigid body 100. As a result, the rigidity of body 100 can be increased.

(2) In cutting tool body 100 according to (1), recess 5 may have a portion in which a depth of recess 5 in the direction from front end surface 1 toward rear end surface 2 decreases toward an inside of cutting tool body 100. Thus, the rigidity of body 100 can be increased as compared with the case where the depth of recess 5 increases toward the inside of cutting tool body 100.

(3) A cutting insert 200 according to the present disclosure includes a top surface 50, a bottom surface 60, and a side surface 70. Bottom surface 60 is located opposite to top surface 50. Side surface 70 is contiguous to each of top surface 50 and bottom surface 60. A ridgeline 80 between top surface 50 and side surface 70 includes a cutting edge. Side surface 70 includes: a first side surface portion 71 contiguous to bottom surface 60 and inclined at a first angle relative to bottom surface 60; and a second side surface portion 72 contiguous to first side surface portion 71 and inclined at a second angle relative to bottom surface 60. The first angle is larger than the second angle.

When a cutting insert 200 is attached to body 100, a fastening screw 400 is inserted into an insert mounting hole 9, to thereby press cutting insert 200 against body 100. At this time, stress is applied to a region between insert mounting hole 9 and side surface 70. In cutting insert 200 according to (3), side surface 70 includes a first side surface portion 71 contiguous to bottom surface 60 and inclined at the first angle relative to bottom surface 60. Thereby, the cross-sectional area of the region between insert mounting hole 9 and side surface 70 is larger than that in the case where side surface 70 does not include first side surface portion 71. As a result, the rigidity of cutting insert 200 can be increased as compared with the case where side surface 70 does not include first side surface portion 71.

(4) In cutting insert 200 according to (3), the first angle may be 70° or more and 90° or less. Thereby, the rigidity of cutting insert 200 can be further increased.

(5) In cutting insert 200 according to (3) or (4), in a cross section perpendicular to bottom surface 60, a height of first side surface portion 71 may be 0.1 mm or more and may be ⅓ or less of a distance between bottom surface 60 and the cutting edge. When the height of first side surface portion 71 is 0.1 mm or more, the rigidity of cutting insert 200 can be effectively increased. When the height of first side surface portion 71 is ⅓ or less of the distance between bottom surface 60 and the cutting edge, second side surface portion 72 can be ensured to have a larger area. Therefore, cutting insert 200 can be firmly attached to body 100.

(6) In cutting insert 200 according to any one of (3) to (5), the cutting edge may have a wiper cutting edge portion 81 and a major cutting edge portion 82. Side surface 70 may have a first region 74 contiguous to wiper cutting edge portion 81 and a second region 76 contiguous to major cutting edge portion 82. First side surface portion 71 may be contiguous to second region 76. Normally, when the cross-sectional area of cutting insert 200 along a plane passing through the central axis of insert mounting hole 9 and substantially perpendicular to second region 76 is defined as a first cross-sectional area, and when the cross-sectional area of cutting insert 200 along a plane passing through the central axis of insert mounting hole 9 and substantially perpendicular to first region 74 is defined as a second cross-sectional area, the first cross-sectional area is smaller than the second cross-sectional area. Thus, the rigidity is lower in the vicinity of second region 76 than in the vicinity of first region 74. By providing first side surface portion 71 to be contiguous to second region 76 having lower rigidity, the cross-sectional area of cutting insert 200 along a plane passing through the central axis of insert mounting hole 9 and substantially perpendicular to second region 76 can be larger than the first cross-sectional area, so that the rigidity of cutting insert 200 can be effectively increased.

(7) In cutting insert 200 according to (6), side surface 70 may have an annular shape, and first side surface portion 71 may be provided on an entire circumference of side surface 70. Thereby, the rigidity of cutting insert 200 can be effectively increased.

(8) A cutting tool according to the present disclosure includes a body 100 and a cutting insert 200 provided in body 100. Body 100 includes: a front end surface 1, a rear end surface 2 located opposite to front end surface 1; an outer circumferential surface 3 contiguous to front end surface 1; a first seating surface 11 contiguous to each of front end surface 1 and outer circumferential surface 3; and a second seating surface 12 contiguous to front end surface 1 and located closer to a central axis A than outer circumferential surface 3. Body 100 is provided with a recess 5 contiguous to each of first seating surface 11, second seating surface 12, and front end surface 1. When front end surface 1 is viewed in a direction from front end surface 1 toward rear end surface 2, a length of recess 5 in a direction perpendicular to a straight line parallel to central axis A and extending along first seating surface 11 is equal to or longer than three times as long as a length of recess 5 in a direction perpendicular to first seating surface 11 and passing through a contact point of second seating surface 12, recess 5, and front end surface 1. Cutting insert 200 includes: a top surface 50; a bottom surface 60 located opposite to top surface 50, and a side surface 70 contiguous to each of top surface 50 and bottom surface 60. A ridgeline 80 between top surface 50 and side surface 70 has a cutting edge. Side surface 70 has: a first side surface portion 71 contiguous to bottom surface 60 and inclined at a first angle relative to bottom surface 60; and a second side surface portion 72 contiguous to first side surface portion 71 and inclined at a second angle relative to bottom surface 60. The first angle is larger than the second angle. Bottom surface 60 faces first seating surface 11, and side surface 70 faces second seating surface 12.

In body 100 of the cutting tool according to (8), recess 5 is formed to extend toward central axis A of body 100. Thus, as compared with the case where recess 5 is formed to extend in the circumferential direction of body 100, the main stress of the cutting force can be distributed toward central axis A of highly rigid body 100. As a result, the rigidity of body 100 can be increased.

In cutting insert 200 of the cutting tool according to (8), side surface 70 includes a first side surface portion 71 contiguous to bottom surface 60 and inclined at a first angle relative to bottom surface 60. Thereby, the cross-sectional area of the region between insert mounting hole 9 and side surface 70 is larger than that in the case where side surface 70 does not include first side surface portion 71. As a result, the rigidity of cutting insert 200 can be increased as compared with the case where side surface 70 does not include first side surface portion 71.

(9) In the cutting tool according to (8), recess 5 may have a portion in which a depth of recess 5 in the direction from front end surface 1 toward rear end surface 2 decreases toward an inside of body 100. Thereby, the rigidity of body 100 can be increased as compared with the case where the depth of recess 5 increases toward the inside of cutting tool body 100.

(10) In the cutting tool according to (8) or (9), the first angle may be 70° or more and 90° or less. Thereby, the rigidity of cutting insert 200 can be further increased.

(11) In the cutting tool according to any one of (8) to (10), in a cross section perpendicular to bottom surface 60, a height of first side surface portion 71 may be 0.1 mm or more and may be ⅓ or less of a distance between bottom surface 60 and the cutting edge. When the height of first side surface portion 71 is 0.1 mm or more, the rigidity of cutting insert 200 can be effectively increased. When the height of first side surface portion 71 is ⅓ or less of the distance between bottom surface 60 and the cutting edge, second side surface portion 72 can be ensured to have a larger area. Thus, cutting insert 200 can be firmly attached to body 100.

(12) In the cutting tool according to any one of (8) to (11), the cutting edge may have a wiper cutting edge portion 81 and a major cutting edge portion 82. Side surface 70 may have a first region 74 contiguous to wiper cutting edge portion 81 and a second region 76 contiguous to major cutting edge portion 82. First side surface portion 71 may be contiguous to second region 76. Normally, when the cross-sectional area of cutting insert 200 along a plane passing through the central axis of insert mounting hole 9 and substantially perpendicular to second region 76 is defined as a first cross-sectional area, and when the cross-sectional area of cutting insert 200 along a plane passing through the central axis of insert mounting hole 9 and substantially perpendicular to first region 74 is defined as a second cross-sectional area, the first cross-sectional area is smaller than the second cross-sectional area. Thus, the rigidity is lower in the vicinity of second region 76 than in the vicinity of first region 74. By providing first side surface portion 71 to be contiguous to second region 76 having lower rigidity, the cross-sectional area of cutting insert 200 along a plane passing through the central axis of insert mounting hole 9 and substantially perpendicular to second region 76 can be larger than the first cross-sectional area, so that the rigidity of cutting insert 200 can be effectively increased.

(13) In the cutting tool according to any one of (8) to (12), side surface 70 may have an annular shape. First side surface portion 71 may be provided on an entire circumference of side surface 70. Thereby, the rigidity of cutting insert 200 can be effectively increased.

DETAILS OF EMBODIMENTS OF THE PRESENT DISCLOSURE

Then, embodiments of the present disclosure will be described in detail with reference to the accompanying drawings, in which the same or corresponding portions are denoted by the same reference characters, and the description thereof will not be repeated.

First Embodiment

First, the configuration of a cutting tool body 100 according to the first embodiment will be described. FIG. 1 is a schematic perspective view showing a configuration of cutting tool body 100 according to the first embodiment. Cutting tool body 100 according to the first embodiment is a body 100 for an end mill, for example. Cutting tool body 100 is configured to be rotatable about a central axis A. As shown in FIG. 1, cutting tool body 100 mainly includes a front end surface 1, a rear end surface 2, a shank portion 4, an outer circumferential surface 3, a first seating surface 11, a second seating surface 12, and a third seating surface 13. Rear end surface 2 is located opposite to front end surface 1. Front end surface 1 is located on one end side of central axis A. Rear end surface 2 is located on the other end side of the axis line. Shank portion 4 is a portion attached to a main shaft (not shown).

Outer circumferential surface 3 is contiguous to front end surface 1. First seating surface 11 is contiguous to each of front end surface 1 and outer circumferential surface 3. Second seating surface 12 is contiguous to front end surface 1. Second seating surface 12 is located closer to central axis A than outer circumferential surface 3. Second seating surface 12 is spaced apart from outer circumferential surface 3. In the direction perpendicular to central axis A (in the radial direction), first seating surface 11 is located between outer circumferential surface 3 and second seating surface 12. Third seating surface 13 is contiguous to outer circumferential surface 3 and first seating surface 11. In the direction parallel to central axis A, third seating surface 13 is located between front end surface 1 and rear end surface 2. In the direction parallel to central axis A, each of first seating surface 11 and second seating surface 12 is located between third seating surface 13 and front end surface 1.

Cutting tool body 100 is provided with a counterbore portion 10, a swarf discharge groove 15, a first recess 5, and a second recess 6. In counterbore portion 10, a cutting insert 200 as described later is disposed. Counterbore portion 10 is formed by first seating surface 11, second seating surface 12, and third seating surface 13. First seating surface 11 is provided with a fastener mounting hole 14. A fastening screw 400 (see FIG. 17) is inserted into fastener mounting hole 14. Swarf discharge groove 15 is contiguous to counterbore portion 10. Counterbore portion 10 is provided on a boundary between front end surface 1 and outer circumferential surface 3. Swarf discharge groove 15 is provided on the rear end surface 2 side with respect to counterbore portion 10. From a different point of view, counterbore portion 10 is located between swarf discharge groove 15 and front end surface 1. Swarf discharge groove 15 is provided with a coolant discharge hole 16. The number of counterbore portions 10 provided in cutting tool body 100 according to the first embodiment is three, for example, but is not limited to three.

Figure 2:
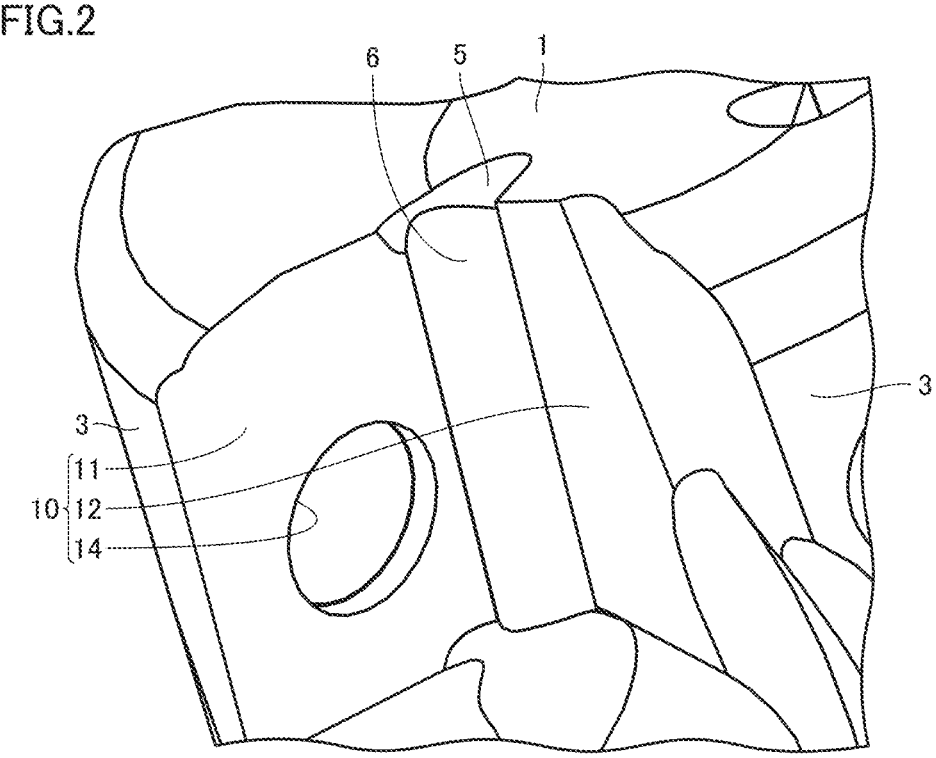
FIG. 2 is an enlarged schematic perspective view of a region II in FIG. 1.

FIG. 2 is an enlarged schematic perspective view of a region II in FIG. 1. First recess 5 is contiguous to each of first seating surface 11, second seating surface 12, and front end surface 1. First recess 5 is a recessed portion opened on the front end surface 1 side. First recess 5 is spaced apart from third seating surface 13. Second recess 6 is contiguous to first recess 5. Second recess 6 is located on the rear end surface 2 side with respect to first recess 5. From a different point of view, first recess 5 is located between second recess 6 and front end surface 1. Second recess 6 is contiguous to each of first seating surface 11, second seating surface 12, and third seating surface 13. Second recess 6 is spaced apart from front end surface 1.

Figure 3:
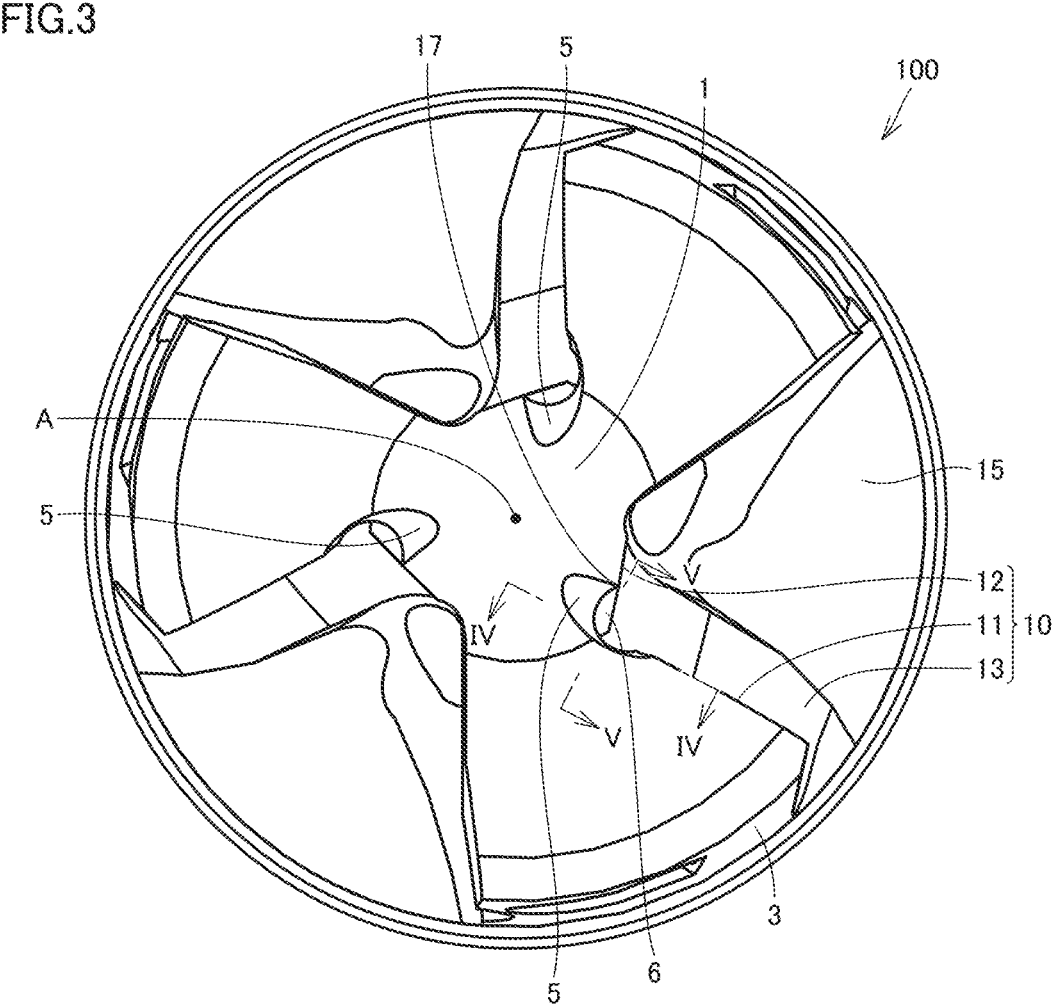
FIG. 3 is a schematic front view showing a configuration of the cutting tool body according to the first embodiment.

FIG. 3 is a schematic front view showing a configuration of cutting tool body 100 according to the first embodiment.

As shown in FIG. 3, when viewed from front end surface 1 toward rear end surface 2, first recess 5 extends in a direction along first seating surface 11. First recess 5 is located inward of first seating surface 11. From a different point of view, first recess 5 is located between first seating surface 11 and central axis A in the radial direction. First seating surface 11 is located between outer circumferential surface 3 and first recess 5.

Figure 4:
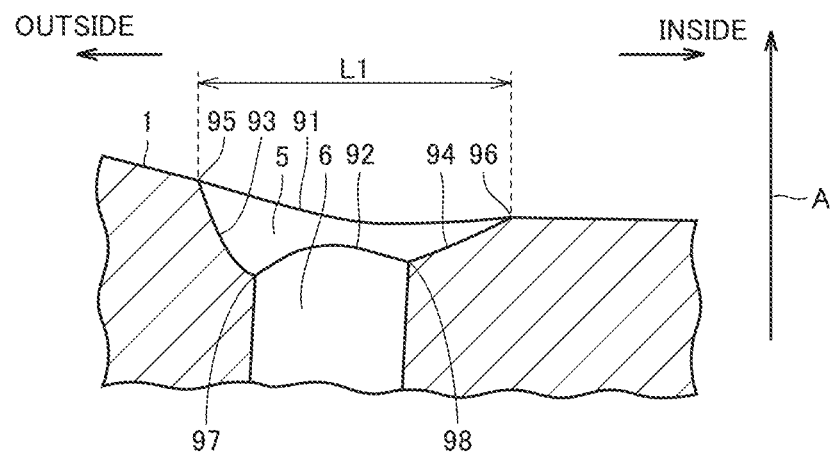
FIG. 4 is a schematic cross-sectional view taken along a line IV-IV in FIG. 3.

FIG. 4 is a schematic cross-sectional view taken along a line Iv-Iv in FIG. 3. FIG. 4 is an end view of body 100 shown in a cross section cut along a plane along first seating surface 11. As shown in FIG. 4, first recess 5 has an opening end 91, a first bottom portion 93, a second bottom portion 94, and a boundary portion 92. First bottom portion 93 is located outward of second recess 6. Second bottom portion 94 is located inward of second recess 6. Second recess 6 is located between first bottom portion 93 and second bottom portion 94. Boundary portion 92 is a boundary between first recess 5 and second recess 6.

As shown in FIG. 4, in a cross-sectional view, opening end 91 may be curved so as to be recessed toward rear end surface 2. Boundary portion 92 may be curved so as to protrude toward front end surface 1. As shown in FIG. 4, in the direction perpendicular to a straight line parallel to central axis A and extending along first seating surface 11, a length (a first length L1) of first recess 5 is 0.6 mm or more and 20.0 mm or less, for example.

As shown in FIG. 4, in the direction parallel to central axis A, the boundary (a first boundary 95) between first bottom portion 93 and opening end 91 may be located forward of the boundary (a second boundary 96) between second bottom portion 94 and opening end 91. The direction of forward is directed from rear end surface 2 toward front end surface 1. In the direction perpendicular to a straight line parallel to central axis A and extending along first seating surface 11, first length L1 is equal to the distance between first boundary 95 and second boundary 96. As shown in FIG. 4, in the direction parallel to central axis A, the boundary (a third boundary 97) between first bottom portion 93 and boundary portion 92 may be located rearward of the boundary (a fourth boundary 98) between second bottom portion 94 and boundary portion 92. The direction of rearward is directed from front end surface 1 toward rear end surface 2.

As shown in FIG. 4, first recess 5 may have a portion (second bottom portion 94) in which the depth of first recess 5 in the direction from front end surface 1 toward rear end surface 2 decreases toward the inside of cutting tool body 100. From a different point of view, the distance between opening end 91 and second bottom portion 94 in the direction parallel to central axis A may decrease toward the inside of cutting tool body 100. Similarly, first recess 5 may have a portion (first bottom portion 93) in which the depth of first recess 5 in the direction from front end surface 1 toward rear end surface 2 decreases toward the outside of cutting tool body 100. From a different point of view, the distance between opening end 91 and first bottom portion 93 in the direction parallel to central axis A may decrease toward the outside of cutting tool body 100.

Figure 5:
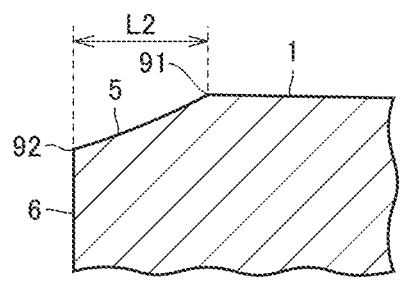
FIG. 5 is a schematic cross-sectional view taken along a line V-V in FIG. 3.

FIG. 5 is a schematic cross-sectional view taken along a line V-V in FIG. 3. FIG. 5 is an end view of body 100 shown in a cross section cut along a plane perpendicular to first seating surface 11 and passing through a contact point 17 of second seating surface 12, first recess 5, and front end surface 1. As shown in FIG. 5, the length (a second length L2) of first recess 5 in the direction perpendicular to first seating surface 11 is 0.2 mm or more and 4.0 mm or less, for example. First length L1 is equal to or longer than three times as long as second length L2. First length L1 may be equal to or longer than four times or five times as long as second length L2. First length L1 may be equal to or shorter than 20 times as long as second length L2.

Second Embodiment

Figure 6:
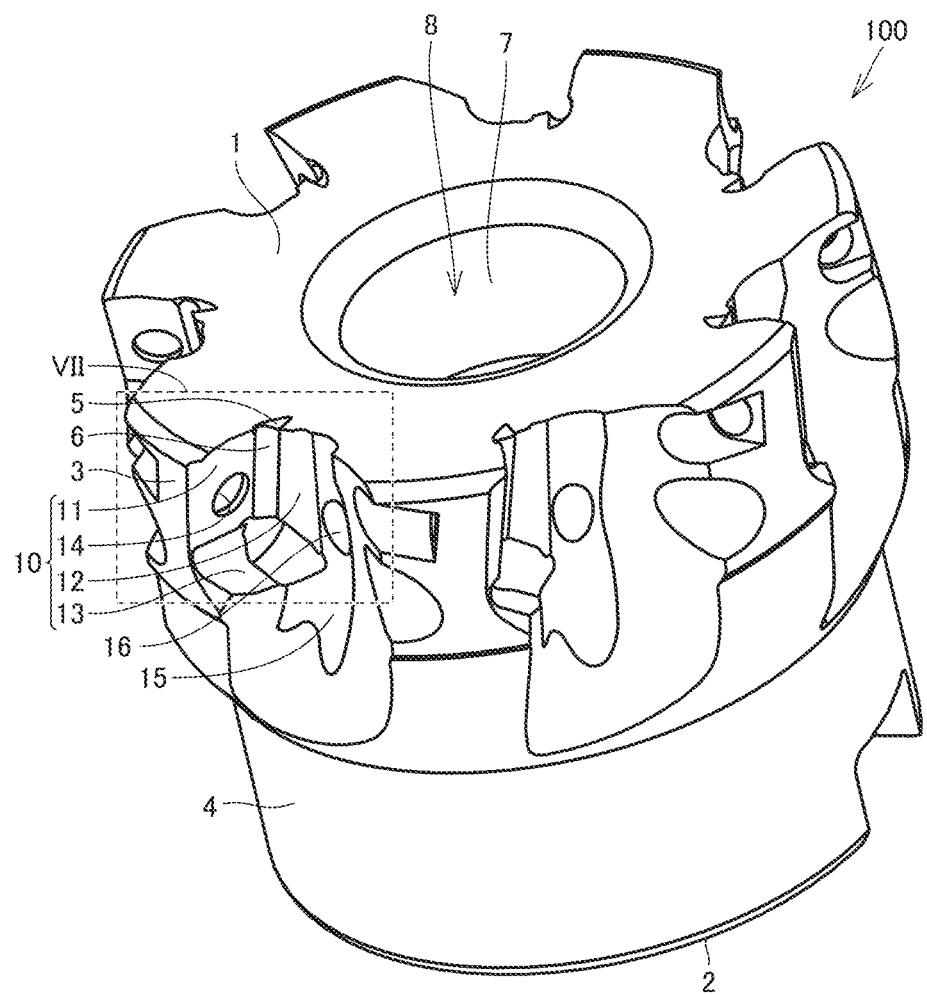
FIG. 6 is a schematic perspective view showing a configuration of a cutting tool body according to a second embodiment.
Figure 7:
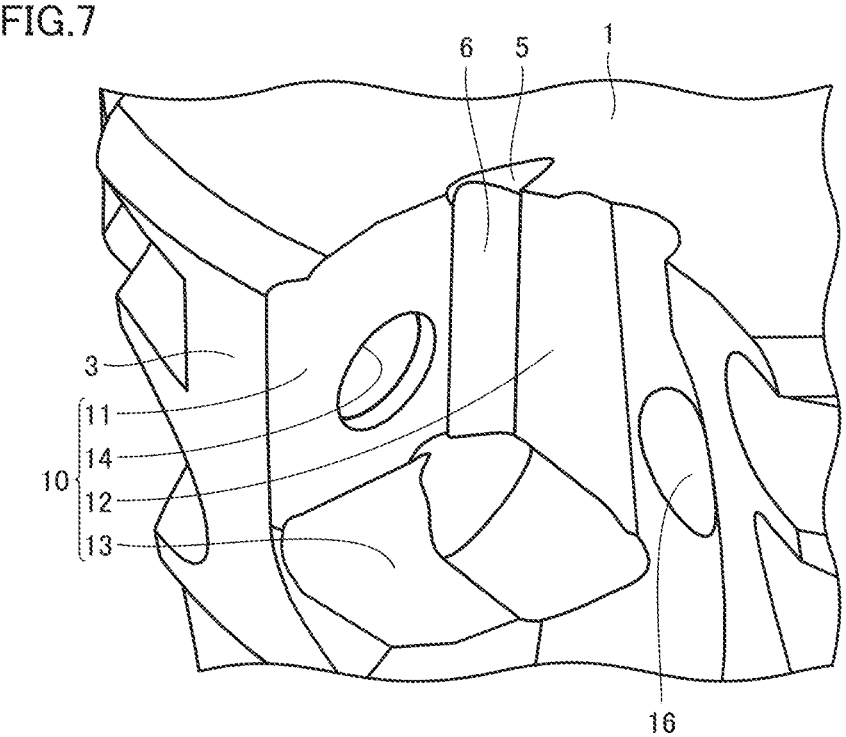
FIG. 7 is an enlarged schematic perspective view of a region VII in FIG. 6.

Then, the configuration of a cutting tool body 100 according to the second embodiment will be described. FIG. 6 is a schematic perspective view showing a configuration of cutting tool body 100 according to the second embodiment. FIG. 7 is an enlarged schematic perspective view of a region VII in FIG. 6. Cutting tool body 100 according to the second embodiment is a body 100 for a milling cutter, for example.

As shown in FIGS. 6 and 7, cutting tool body 100 mainly includes a front end surface 1, a rear end surface 2, an outer circumferential portion 4, an outer circumferential surface 3, an inner circumferential surface 7, a first seating surface 11, a second seating surface 12, and a third seating surface 13. Cutting tool body 100 is provided with a through hole 8 along central axis A. Through hole 8 is formed by inner circumferential surface 7. Inner circumferential surface 7 is located inside outer circumferential surface 3. Inner circumferential surface 7 surrounds central axis A. Inner circumferential surface 7 is located between central axis A and outer circumferential surface 3 in the radial direction. First recess 5 provided in cutting tool body 100 according to the first embodiment is also applicable to cutting tool body 100 according to the second embodiment.

The configuration of first recess 5 provided in cutting tool body 100 according to the second embodiment is substantially the same as the configuration of first recess 5 provided in cutting tool body 100 according to the first embodiment. Thus, the same or corresponding portions are denoted by the same reference characters, and the description thereof will not be repeated. The number of counterbore portions 10 provided in cutting tool body 100 according to the second embodiment is seven, for example, but is not limited to seven.

Third Embodiment

Figure 8:
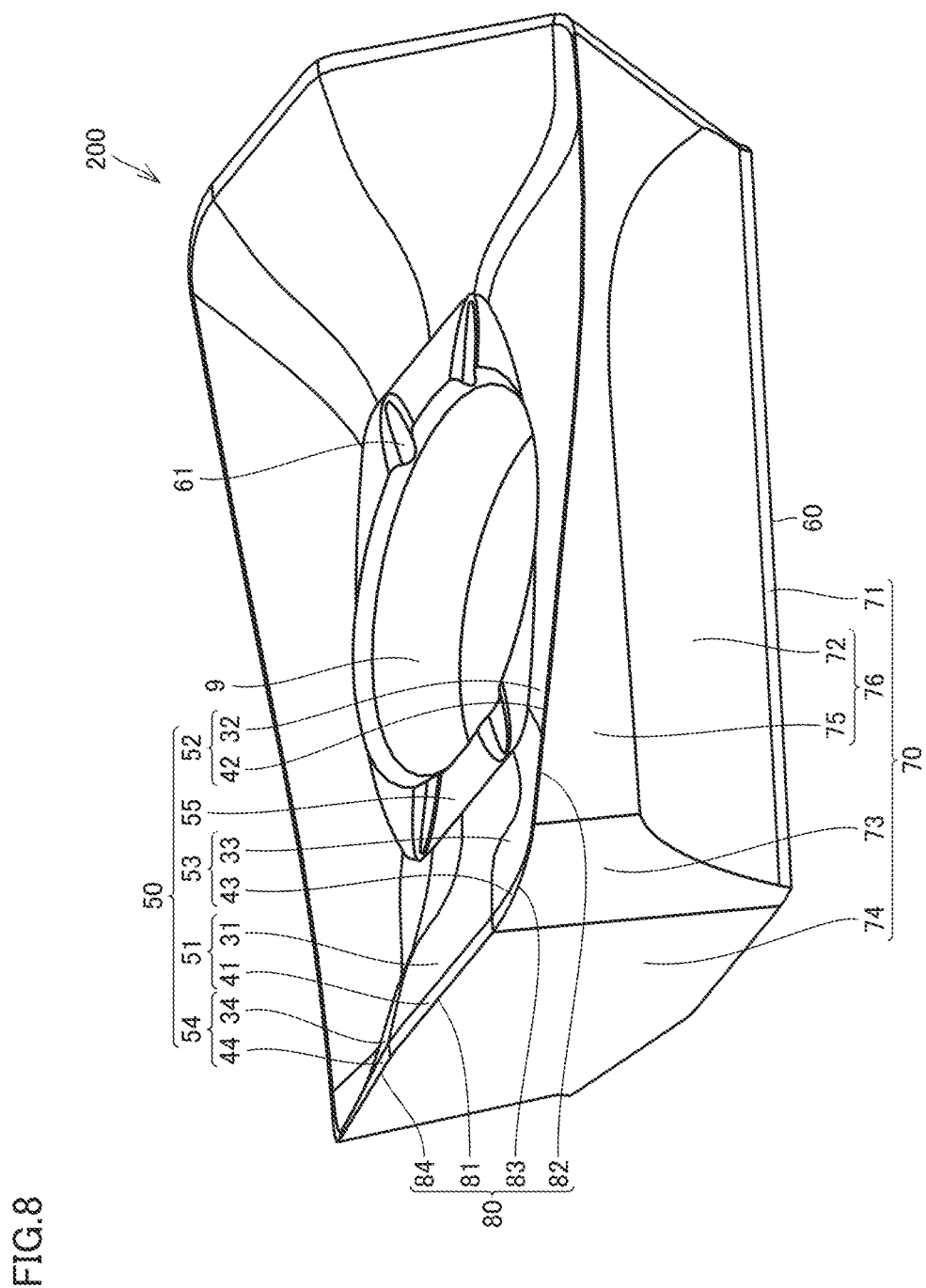
FIG. 8 is a schematic perspective view showing a configuration of a cutting insert according to a third embodiment.

Then, the configuration of cutting insert 200 according to the third embodiment will be described. FIG. 8 is a schematic perspective view showing a configuration of cutting insert 200 according to the third embodiment.

As shown in FIG. 8, cutting insert 200 mainly has a top surface 50, a bottom surface 60, and a side surface 70. Bottom surface 60 is located opposite to top surface 50. Bottom surface 60 is a flat surface. Side surface 70 is contiguous to each of top surface 50 and bottom surface 60. Side surface 70 has an annular shape. Cutting insert 200 is provided with an insert mounting hole 9. Insert mounting hole 9 is a through hole opened at each of top surface 50 and bottom surface 60.

A ridgeline 80 between top surface 50 and side surface 70 includes a cutting edge. The cutting edge includes a major cutting edge portion 82, a nose cutting edge portion 83, a wiper cutting edge portion 81, and a sub-cutting edge portion 84. Side surface 70 includes a first side surface portion 71, a first region 74, a second region 76, and a third region 73. First side surface portion 71 is contiguous to bottom surface 60. First region 74 is contiguous to each of wiper cutting edge portion 81 and sub-cutting edge portion 84. Second region 76 is contiguous to major cutting edge portion 82. Second region 76 has a second side surface portion 72 and a third side surface portion 75. Third region 73 is contiguous to nose cutting edge portion 83.

Second side surface portion 72 is located between first side surface portion 71 and third side surface portion 75. Second side surface portion 72 is contiguous to each of first side surface portion 71, third side surface portion 75, and third region 73, for example. Third region 73 is located between first region 74 and second region 76. Third region 73 is contiguous to each of first region 74 and second region 76. Third region 73 is located between first region 74 and second side surface portion 72. Third region 73 is located between first region 74 and third side surface portion 75.

Figure 9:
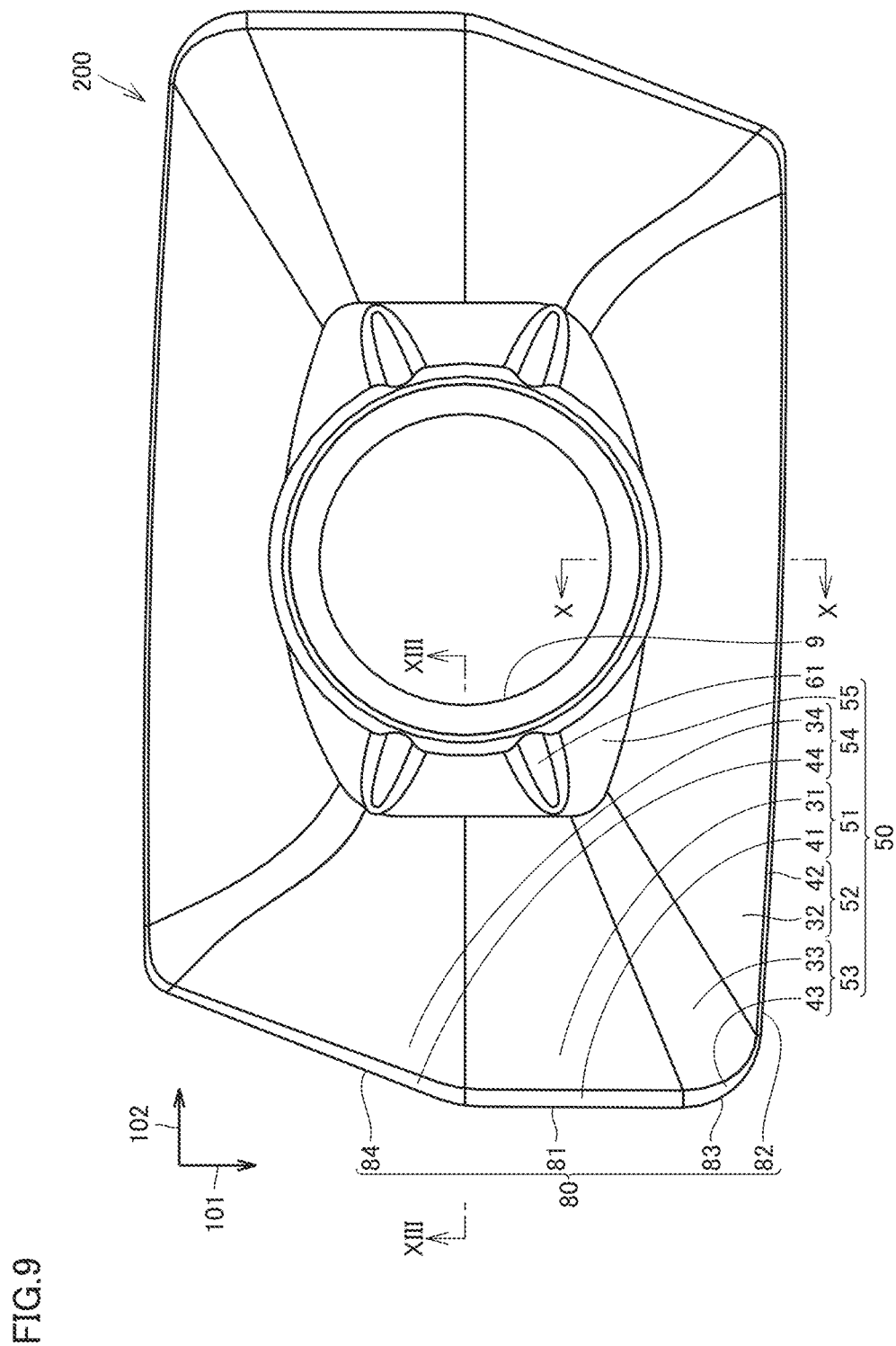
FIG. 9 is a schematic plan view showing a configuration of the cutting insert according to the third embodiment.

FIG. 9 is a schematic plan view showing a configuration of cutting insert 200 according to the third embodiment. FIG. 9 shows top surface 50 viewed in a direction perpendicular to bottom surface 60. Wiper cutting edge portion 81 and major cutting edge portion 82 are curved, for example. Sub-cutting edge portion 84 is linear, for example. Sub-cutting edge portion 84 may be curved. As shown in FIG. 9, when viewed in the direction perpendicular to bottom surface 60, each of wiper cutting edge portion 81, major cutting edge portion 82, and sub-cutting edge portion 84 may be linear. Nose cutting edge portion 83 is curved. Major cutting edge portion 82 is contiguous to one end of nose cutting edge portion 83. Wiper cutting edge portion 81 is contiguous to the other end of nose cutting edge portion 83. Nose cutting edge portion 83 is located between major cutting edge portion 82 and wiper cutting edge portion 81.

One end of wiper cutting edge portion 81 is contiguous to nose cutting edge portion 83. The other end of wiper cutting edge portion 81 is contiguous to sub-cutting edge portion 84. When viewed in the direction perpendicular to bottom surface 60, cutting insert 100 extends in a long-side direction 102 and a short-side direction 101. Major cutting edge portion 82 extends in long-side direction 102. Wiper cutting edge portion 81 extends in short-side direction 101. The extending direction of major cutting edge portion 82 is inclined at an angle of approximately 90° relative to the extending direction of wiper cutting edge portion 81. Sub-cutting edge portion 84 is inclined toward insert mounting hole 9 relative to wiper cutting edge portion 81. The extending direction of sub-cutting edge portion 84 is inclined at an angle larger than 0° and smaller than 90° relative to the extending direction of wiper cutting edge portion 81. Sub-cutting edge portion 84 is inclined relative to each of long-side direction 102 and short-side direction 101.

Top surface 50 has a first rake surface 51, a second rake surface 52, a third rake surface 53, a fourth rake surface 54, and a center flat portion 55. First rake surface 51 is contiguous to wiper cutting edge portion 81. First rake surface 51 has a first land portion 41 and a first rake surface portion 31. First land portion 41 is contiguous to wiper cutting edge portion 81. First rake surface portion 31 is contiguous to first land portion 41. When viewed in the direction perpendicular to bottom surface 60, first land portion 41 is located between first rake surface portion 31 and wiper cutting edge portion 81.

Second rake surface 52 is contiguous to major cutting edge portion 82. Second rake surface 52 has a second land portion 42 and a second rake surface portion 32. Second land portion 42 is contiguous to major cutting edge portion 82. Second rake surface portion 32 is contiguous to second land portion 42. When viewed in the direction perpendicular to bottom surface 60, second land portion 42 is located between second rake surface portion 32 and major cutting edge portion 82.

Third rake surface 53 is contiguous to nose cutting edge portion 83. Third rake surface 53 has a third land portion 43 and a third rake surface portion 33. Third land portion 43 is contiguous to nose cutting edge portion 83. Third rake surface portion 33 is contiguous to third land portion 43. When viewed in the direction perpendicular to bottom surface 60, third land portion 43 is located between third rake surface portion 33 and nose cutting edge portion 83.

Fourth rake surface 54 is contiguous to sub-cutting edge portion 84. Fourth rake surface 54 has a fourth land portion 44 and a fourth rake surface portion 34. Fourth land portion 44 is contiguous to sub-cutting edge portion 84. Fourth rake surface portion 34 is contiguous to fourth land portion 44. When viewed in the direction perpendicular to bottom surface 60, fourth land portion 44 is located between fourth rake surface portion 34 and sub-cutting edge portion 84.

Center flat portion 55 is contiguous to insert mounting hole 9. When viewed in the direction perpendicular to bottom surface 60, center flat portion 55 is located between insert mounting hole 9 and each of first rake surface 51, second rake surface 52, third rake surface 53, and fourth rake surface 54. Center flat portion 55 is provided with four depressed portions 61, for example. When viewed in the direction perpendicular to bottom surface 60 as shown in FIG. 4, the depressed portions are provided between first rake surface 51 and insert mounting hole 9 and between fourth rake surface 54 and insert mounting hole 9.

Figure 10:
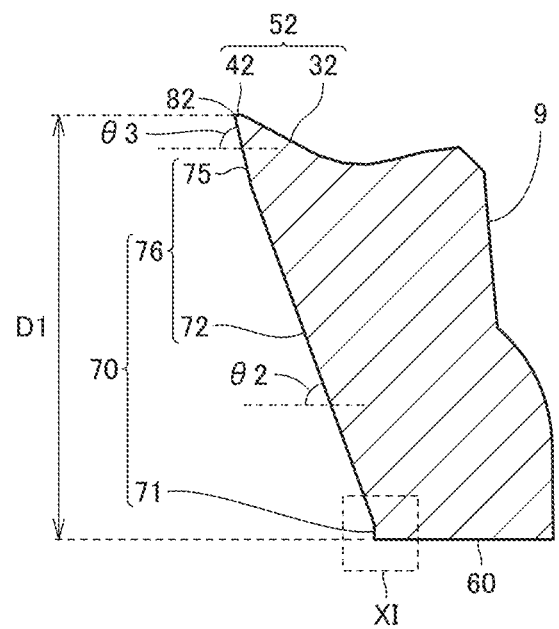
FIG. 10 is a schematic cross-sectional view taken along a line X-X in FIG. 9.

FIG. 10 is a schematic cross-sectional view taken along a line X-X in FIG. 9. FIG. 10 shows a cut plane perpendicular to bottom surface 60, intersecting insert mounting hole 9, and perpendicular to major cutting edge portion 82.

As shown in FIG. 10, second region 76 has a second side surface portion 72 and a third side surface portion 75. Third side surface portion 75 is contiguous to major cutting edge portion 82. Third side surface portion 75 is inclined toward insert mounting hole 9 relative to a plane perpendicular to bottom surface 60. Second side surface portion 72 is contiguous to third side surface portion 75. Second side surface portion 72 is inclined relative to a plane perpendicular to bottom surface 60. The inclination angle (a second angle θ2) of second side surface portion 72 relative to bottom surface 60 is smaller than the inclination angle (a third angle θ3) of third side surface portion 75 relative to bottom surface 60. First side surface portion 71 is contiguous to second side surface portion 72 of second region 76. First side surface portion 71 is located between second side surface portion 72 and bottom surface 60. Second rake surface portion 32 is inclined toward bottom surface 60 relative to second land portion 42.

Figure 11:
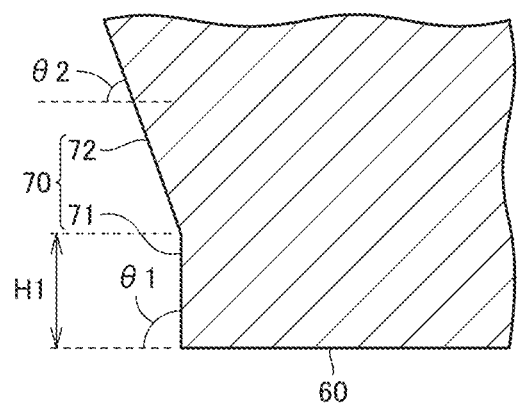
FIG. 11 is an enlarged schematic cross-sectional view of a region XI in FIG. 10.
Figure 12:
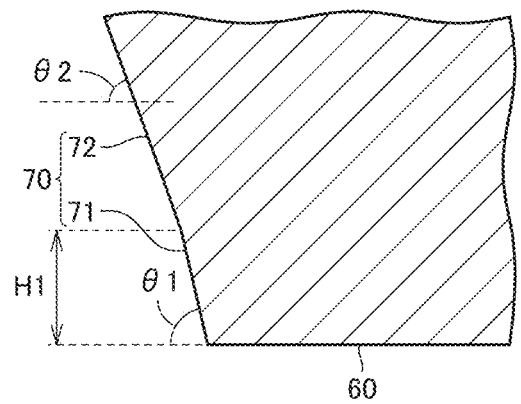
FIG. 12 shows a modification of FIG. 11.

FIG. 11 is an enlarged schematic cross-sectional view of a region XI in FIG. 10. As shown in FIG. 11, first side surface portion 71 is inclined at a first angle θ1 relative to bottom surface 60. First angle θ1 is 90°, for example. FIG. 12 shows a modification of FIG. 11. As shown in FIG. 12, first angle θ1 may be less than 90°, for example. In other words, first angle θ1 is 70° or more and 90° or less, for example. First angle θ1 may be 75° or more and 90° or less, for example, or may be 80° or more and 90° or less, for example. Second side surface portion 72 is inclined at second angle θ2 relative to bottom surface 60. First angle θ1 is larger than second angle θ2.

As shown in FIGS. 11 and 12, in a cross section perpendicular to bottom surface 60, the height (a first height H1) of first side surface portion 71 is 0.1 mm or more. First height H1 may be 0.2 mm or more or may be 0.3 mm or more. In the cross section perpendicular to bottom surface 60, first height H1 may be ⅓ or less of the distance (a first distance D1) between bottom surface 60 and the cutting edge. In the cross section perpendicular to bottom surface 60, first height H1 may be ¼ or less of first distance D1 or may be ⅕ or less of first distance D1.

Figure 13:
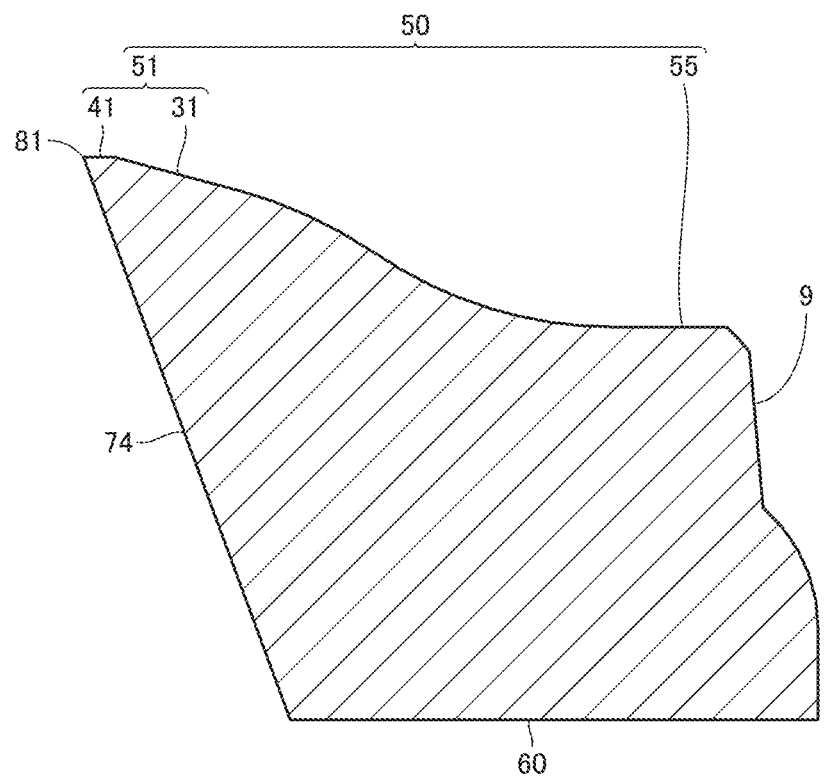
FIG. 13 is a schematic cross-sectional view taken along a line XIII-XIII in FIG. 9.

FIG. 13 is a schematic cross-sectional view taken along a line XIII-XIII in FIG. 9. FIG. 13 shows a cut plane perpendicular to bottom surface 60, intersecting insert mounting hole 9, and perpendicular to sub-cutting edge portion 84.

As shown in FIG. 13, first rake surface portion 31 is inclined toward bottom surface 60 relative to first land portion 41. First region 74 is contiguous to wiper cutting edge portion 81. First region 74 may be contiguous to sub-cutting edge portion 84. First region 74 is inclined toward insert mounting hole 9 relative to a plane perpendicular to bottom surface 60. First region 74 may be contiguous to bottom surface 60. From a different point of view, first side surface portion 71 is provided on the second region 76 side, but may not be provided on the first region 74 side. From a further different point of view, first side surface portion 71 is provided to extend in long-side direction 102 of cutting insert 200, but may not be provided to extend in short-side direction 101 of cutting insert 200.

Fourth Embodiment

Then, the configuration of a cutting insert 200 according to the fourth embodiment will be described. Cutting insert 200 according to the fourth embodiment has the same configuration as that of cutting insert 200 according to the third embodiment except that first side surface portion 71 is provided on the entire circumference of side surface 70. The following describes the configuration different from that of cutting insert 200 according to the third embodiment.

Figure 14:
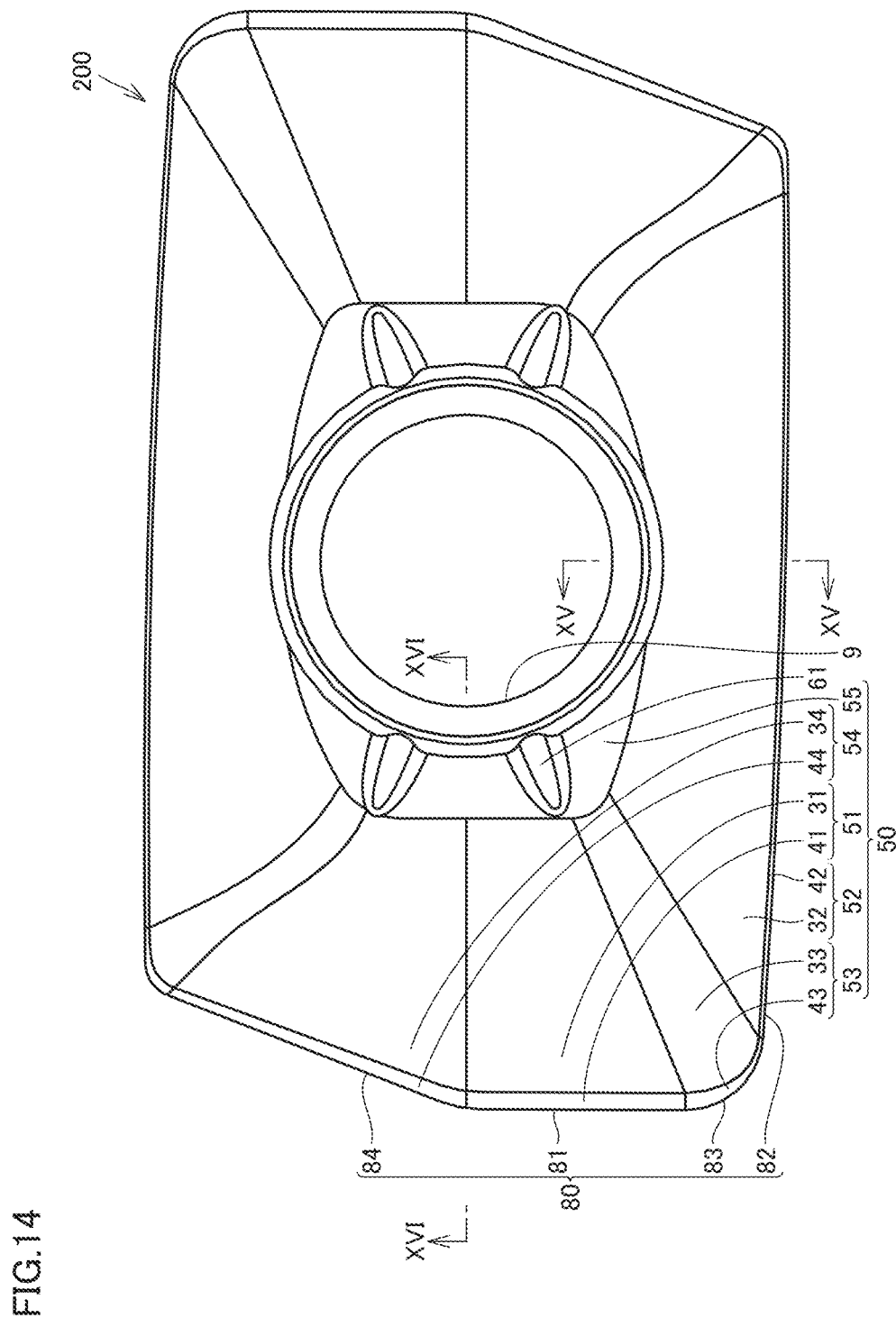
FIG. 14 is a schematic plan view showing a configuration of a cutting insert according to a fourth embodiment.
Figure 15:
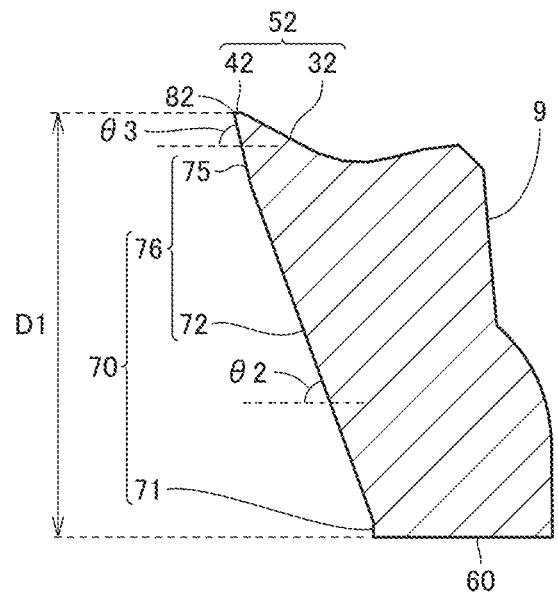
FIG. 15 is a schematic cross-sectional view taken along a line XV-XV in FIG. 14.
Figure 16:
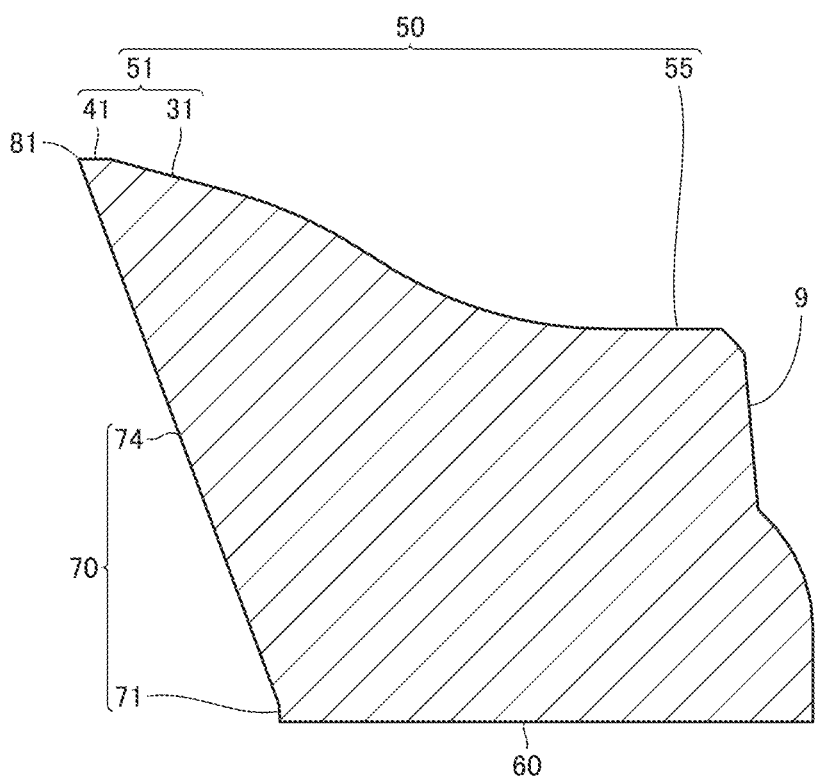
FIG. 16 is a schematic cross-sectional view taken along a line XVI-XVI in FIG. 14.

FIG. 14 is a schematic plan view showing a configuration of cutting insert 200 according to the fourth embodiment. FIG. 15 is a schematic cross-sectional view taken along a line XV-XV in FIG. 14. FIG. 15 shows a cut plane perpendicular to bottom surface 60, intersecting insert mounting hole 9, and perpendicular to major cutting edge portion 82. FIG. 16 is a schematic cross-sectional view taken along a line XVI-XVI in FIG. 14. FIG. 16 show a cut plane perpendicular to bottom surface 60, intersecting insert mounting hole 9, and perpendicular to sub-cutting edge portion 84.

According to cutting insert 200 in the fourth embodiment, first side surface portion 71 is provided on the entire circumference of side surface 70. As shown in FIG. 15, second region 76 has a second side surface portion 72 and a third side surface portion 75. Third side surface portion 75 is contiguous to major cutting edge portion 82. Third side surface portion 75 is inclined toward insert mounting hole 9 relative to a plane perpendicular to bottom surface 60. Second side surface portion 72 is contiguous to third side surface portion 75. Second side surface portion 72 is inclined relative to a plane perpendicular to bottom surface 60. The inclination angle (second angle θ2) of second side surface portion 72 relative to bottom surface 60 is smaller than the inclination angle (third angle θ3) of third side surface portion 75 relative to bottom surface 60. First side surface portion 71 is contiguous to second side surface portion 72 of second region 76. First side surface portion 71 is located between second side surface portion 72 and bottom surface 60.

As shown in FIG. 16, side surface 70 has a first region 74 and a first side surface portion 71. First side surface portion 71 is contiguous to first region 74. First side surface portion 71 is contiguous to bottom surface 60. First side surface portion 71 is located between first region 74 and bottom surface 60.

Fifth Embodiment

Figure 17:
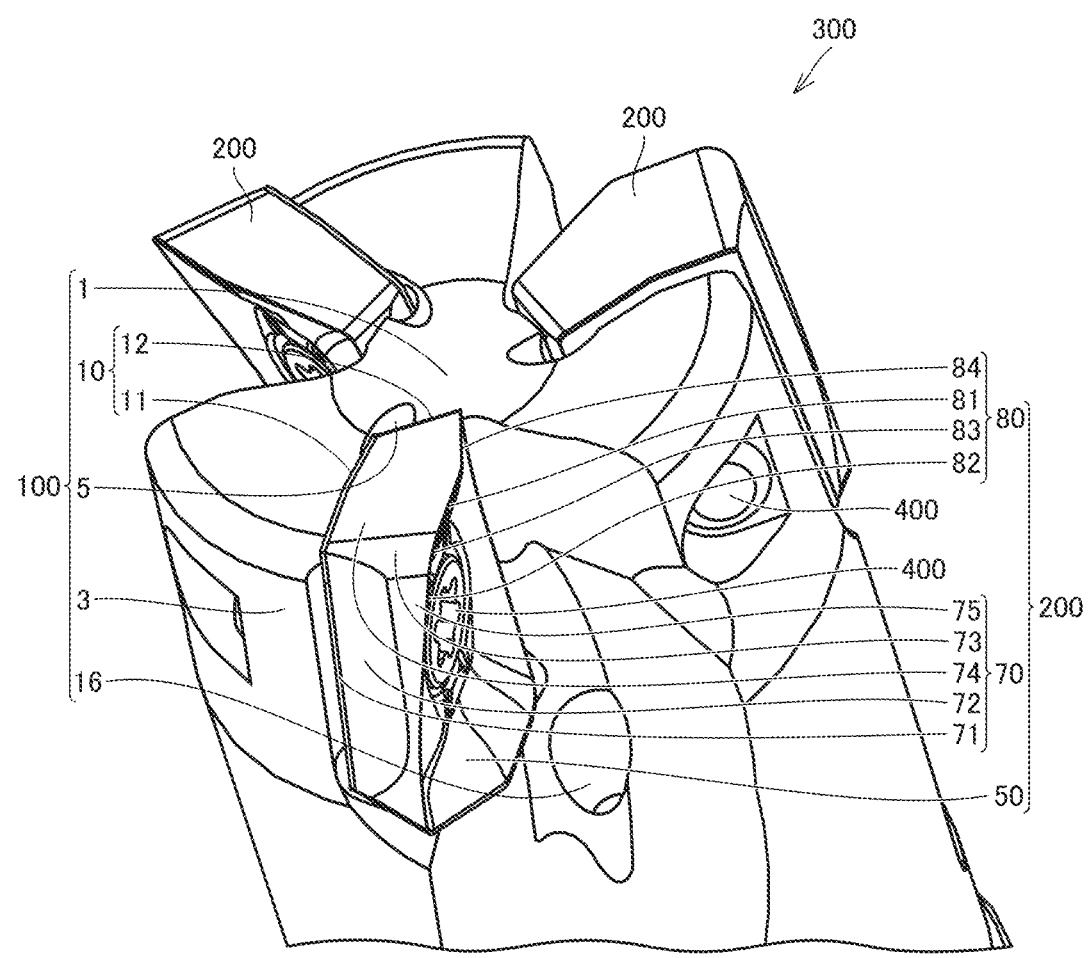
FIG. 17 is a schematic perspective view showing a configuration of a cutting tool according to a fifth embodiment.

Then, the configuration of a cutting tool 300 according to the fifth embodiment will be described. FIG. 17 is a schematic perspective view showing a configuration of cutting tool 300 according to the fifth embodiment. As shown in FIG. 17, cutting tool 300 according to the fifth embodiment mainly includes body 100 according to the first embodiment or the second embodiment, cutting insert 200 according to the third embodiment or the fourth embodiment, and a fastening screw 400.

Body 100 has front end surface 1, rear end surface 2, outer circumferential surface 3, first seating surface 11, and second seating surface 12. Rear end surface 2 is located opposite to front end surface 1. Outer circumferential surface 3 is contiguous to front end surface 1. First seating surface 11 is contiguous to each of front end surface 1 and outer circumferential surface 3. Second seating surface 12 is contiguous to front end surface 1 and located closer to central axis A than outer circumferential surface 3. Body 100 is provided with recess 5 contiguous to each of first seating surface 11, second seating surface 12, and front end surface 1. The length of recess 5 in the direction perpendicular to central axis A and extending along first seating surface 11 is equal to or longer than three times as long as the length of recess 5 in the direction perpendicular to first seating surface 11 and passing through a contact point of second seating surface 12, recess 5, and front end surface 1.

Cutting insert 200 has top surface 50, bottom surface 60, and side surface 70. Bottom surface 60 is located opposite to top surface 50. Side surface 70 is contiguous to each of top surface 50 and bottom surface 60. Ridgeline 80 between top surface 50 and side surface 70 has a cutting edge. Side surface 70 is contiguous to bottom surface 60. Side surface 70 has first side surface portion 71 and second side surface portion 72. First side surface portion 71 is inclined at a first angle θ1 relative to bottom surface 60. Second side surface portion 72 is contiguous to first side surface portion 71. Second side surface portion 72 is inclined at second angle θ2 relative to bottom surface 60. First angle θ1 is larger than second angle θ2.

Cutting insert 200 is provided in body 100. Cutting insert 200 is fixed to body 100 with fastening screw 400. Bottom surface 60 of cutting insert 200 faces first seating surface 11 of body 100. Bottom surface 60 of cutting insert 200 is in contact with first seating surface 11 of body 100. Side surface 70 of cutting insert 200 faces second seating surface 12 of body 100. Specifically, one of a pair of second regions 76 faces second seating surface 12 of body 100. The other of the pair of second regions 76 is exposed on the outer circumferential surface 3 side of body 100. One of the pair of first regions 74 faces third seating surface 13 of body 100. The other of the pair of first regions 74 is exposed on the front end surface 1 side of body 100.

The following describes the functions and effects of body 100 for cutting tool 300, cutting insert 200, and cutting tool 300 according to the above-described embodiment.

According to body 100 for cutting tool 300 in the above embodiment and cutting tool 300 having this body 100 for cutting tool 300, recess 5 is formed to extend toward central axis A of body 100. Thus, the main stress of the cutting force can be distributed toward central axis A of highly rigid body 100 as compared with the case where recess 5 is formed to extend in the circumferential direction of body 100. As a result, the rigidity of body 100 can be increased.

Further, according to body 100 for cutting tool 300 in the above embodiment and cutting tool 300 having this body 100 for cutting tool 300, recess 5 may have a portion in which the depth of recess 5 in the direction from front end surface 1 toward rear end surface 2 decreases toward the inside of body 100 for cutting tool 300. Thereby, the rigidity of body 100 can be increased as compared with the case where the depth of recess 5 increases toward the inside of body 100 for cutting tool 300.

According to cutting insert 200 in the above embodiment and cutting tool 300 having this cutting insert 200, bottom surface 60 is located opposite to top surface 50. Side surface 70 is contiguous to each of top surface 50 and bottom surface 60. Ridgeline 80 between top surface 50 and side surface 70 includes a cutting edge. Side surface 70 includes: first side surface portion 71 contiguous to bottom surface 60 and inclined at first angle θ1 relative to bottom surface 60; and second side surface portion 72 contiguous to first side surface portion 71 and inclined at second angle θ2 relative to bottom surface 60. First angle θ1 is larger than second angle θ2.

When cutting insert 200 is attached to body 100, fastening screw 400 is inserted into insert mounting hole 9, to thereby press cutting insert 200 against body 100. At this time, stress is applied to a region between insert mounting hole 9 and side surface 70. According to cutting insert 200 in the above embodiment and cutting tool 300 having this cutting insert 200, side surface 70 includes: first side surface portion 71 contiguous to bottom surface 60 and inclined at first angle θ1 relative to bottom surface 60; and second side surface portion 72 inclined at second angle θ2 relative to bottom surface 60. Also, first angle θ1 is larger than second angle θ2. Thereby, the cross-sectional area of the region between insert mounting hole 9 and side surface 70 is larger than that in the case where first angle θ1 is equal to or smaller than second angle θ2. Therefore, the rigidity of cutting insert 200 can be increased.

Further, according to cutting insert 200 in the above embodiment and cutting tool 300 having this cutting insert 200, first angle θ1 may be 70° or more and 90° or less. Thereby, the rigidity of cutting insert 200 can be further increased.

Further, according to cutting insert 200 in the above embodiment and cutting tool 300 having this cutting insert 200, in the cross section perpendicular to bottom surface 60, the height of first side surface portion 71 may be 0.1 mm or more and may be ⅓ or less of the distance between bottom surface 60 and the cutting edge. When the height of first side surface portion 71 is 0.1 mm or more, the rigidity of cutting insert 200 can be effectively increased. When the height of first side surface portion 71 is ⅓ or less of the distance between bottom surface 60 and the cutting edge, second side surface portion 72 can be ensured to have a larger area. Therefore, cutting insert 200 can be firmly attached to body 100.

Further, according to cutting insert 200 in the above embodiment and cutting tool 300 having this cutting insert 200, the cutting edge may have wiper cutting edge portion 81 and major cutting edge portion 82. Side surface 70 may have first region 74 contiguous to wiper cutting edge portion 81 and second region 76 contiguous to major cutting edge portion 82. First side surface portion 71 may be contiguous to second region 76. Normally, second region 76 is smaller in cross-sectional area and lower in rigidity than first region 74. By providing first side surface portion 71 in first region 74 having lower rigidity, the rigidity of cutting insert 200 can be effectively increased.

Further, according to cutting insert 200 in the above embodiment and cutting tool 300 having this cutting insert 200, side surface 70 may have an annular shape, and first side surface portion 71 may be provided on the entire circumference of side surface 70. Thereby, the rigidity of cutting insert 200 can be further increased.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

1 front end surface, 2 rear end surface, 3 outer circumferential surface, 4 shank portion, outer circumference portion, 5 first recess, 6 second recess, 7 inner circumferential surface, 8 through hole, 9 insert mounting hole, 10 counterbore portion, 11 first seating surface, 12 second seating surface, 13 third seating surface, 14 fastener mounting hole, 15 swarf discharge groove, 16 coolant discharge hole, 17 contact point, 31 first rake surface portion, 32 second rake surface portion, 33 third rake surface portion, 34 fourth rake surface portion, 41 first land portion, 42 second land portion, 43 third land portion, 44 fourth land portion, 50 top surface, 51 first rake surface, 52 second rake surface, 53 third rake surface, 54 fourth rake surface, 55 center flat portion, 60 bottom surface, 61 depressed portion, 70 side surface, 71 first side surface portion, 72 second side surface portion, 73 third region, 74 first region, 75 third side surface portion, 76 second region, 80 ridgeline, 81 wiper cutting edge portion, 82 major cutting edge portion, 83 nose cutting edge portion, 84 sub-cutting edge portion, 91 opening end, 92 boundary portion, 93 first bottom portion, 94 second bottom portion, 95 first boundary, 96 second boundary, 97 third boundary, 98 fourth boundary, 100 cutting tool body (body), 101 short-side direction, 102 long-side direction, 200 cutting insert, 300 cutting tool, 400 fastening screw, A central axis, D1 first distance, H1 first height, L1 first length, L2 second length, θ1 first angle, θ2 second angle, θ3 third angle.

The invention claimed is:

1. A cutting tool body comprising:
a front end surface;
a rear end surface located opposite to the front end surface;
an outer circumferential surface contiguous to the front end surface;
a first seating surface contiguous to each of the front end surface and the outer circumferential surface; and
a second seating surface contiguous to the front end surface and located closer to a central axis than the outer circumferential surface, wherein
the cutting tool body is provided with a recess contiguous to each of the first seating surface, the second seating surface, and the front end surface, and
when the front end surface is viewed in a direction from the front end surface toward the rear end surface,
a length of the recess in a direction perpendicular to a straight line parallel to the central axis and extending along the first seating surface is equal to or longer than three times as long as a length of the recess in a direction perpendicular to the first seating surface and passing through a contact point at which the second seating surface, the recess, and the front end surface contact each other.

2. The cutting tool body according to claim 1, wherein the recess has a portion in which a depth of the recess in the direction from the front end surface toward the rear end surface decreases toward an inside of the cutting tool body.

3. The cutting body according to claim 1, wherein the second seating surface is closer to the central axis than the first seating surface is to the central axis.

4. The cutting body according to claim 1, wherein the first seating surface includes a fastener mounting hole therethrough.

5. A cutting tool comprising:
a body; and
a cutting insert provided in the body, wherein
the body includes
a front end surface,
a rear end surface located opposite to the front end surface,
an outer circumferential surface contiguous to the front end surface,
a first seating surface contiguous to each of the front end surface and the outer circumferential surface, and
a second seating surface contiguous to the front end surface and located closer to a central axis than the outer circumferential surface,
the body is provided with a recess contiguous to each of the first seating surface, the second seating surface, and the front end surface,
when the front end surface is viewed in a direction from the front end surface toward the rear end surface,
a length of the recess in a direction perpendicular to a straight line parallel to the central axis and extending along the first seating surface is equal to or longer than three times as long as a length of the recess in a direction perpendicular to the first seating surface and passing through a contact point at which the second seating surface, the recess, and the front end surface contact each other,
the cutting insert includes
a top surface,
a bottom surface located opposite to the top surface, and
a side surface contiguous to each of the top surface and the bottom surface,
a ridgeline between the top surface and the side surface has a cutting edge,
the side surface has
a first side surface portion contiguous to the bottom surface and inclined at a first angle relative to the bottom surface, and
a second side surface portion contiguous to the first side surface portion and inclined at a second angle relative to the bottom surface,
the first angle is larger than the second angle, and
the bottom surface faces the first seating surface and the side surface faces the second seating surface.

6. The cutting tool according to claim 5, wherein the recess has a portion in which a depth of the recess in the direction from the front end surface toward the rear end surface decreases toward an inside of the body.

7. The cutting tool according to claim 5, wherein the first angle is 70° or more and 90° or less.

8. The cutting tool according to claim 5, wherein, in a cross section perpendicular to the bottom surface, a height of the first side surface portion is 0.1 mm or more and is ⅓ or less of a distance between the bottom surface and the cutting edge.

9. The cutting tool according to claim 5, wherein
the cutting edge has a wiper cutting edge portion and a major cutting edge portion,
the side surface has
a first region contiguous to the wiper cutting edge portion, and
a second region contiguous to the major cutting edge portion, and
the first side surface portion is contiguous to the second region.

10. The cutting tool according to claim 5, wherein
the side surface has an annular shape, and
the first side surface portion is provided on an entire circumference of the side surface.

11. The cutting tool according to claim 5, wherein the second seating surface is closer to the central axis than the first seating surface is to the central axis.

12. The cutting tool according to claim 5, wherein the first seating surface includes a fastener mounting hole therethrough.

* * * * *